3,473,721
DEVICE FOR THE SEAM WELDING OF BAND ENDS
Hans Heymann, Eschborn, Taunus, and Hans Rottmann, Bergen-Enckheim, Germany, assignors to Messer Griesheim G.m.b.H., Frankfurt am Main, Germany
Filed Apr. 14, 1967, Ser. No. 630,876
Claims priority, application Germany, Apr. 14, 1966,
M 69,142, M 69,174
Int. Cl. B23k *11/06;* B21b *15/00;* B23p *25/00*
U.S. Cl. 228—18                                                9 Claims

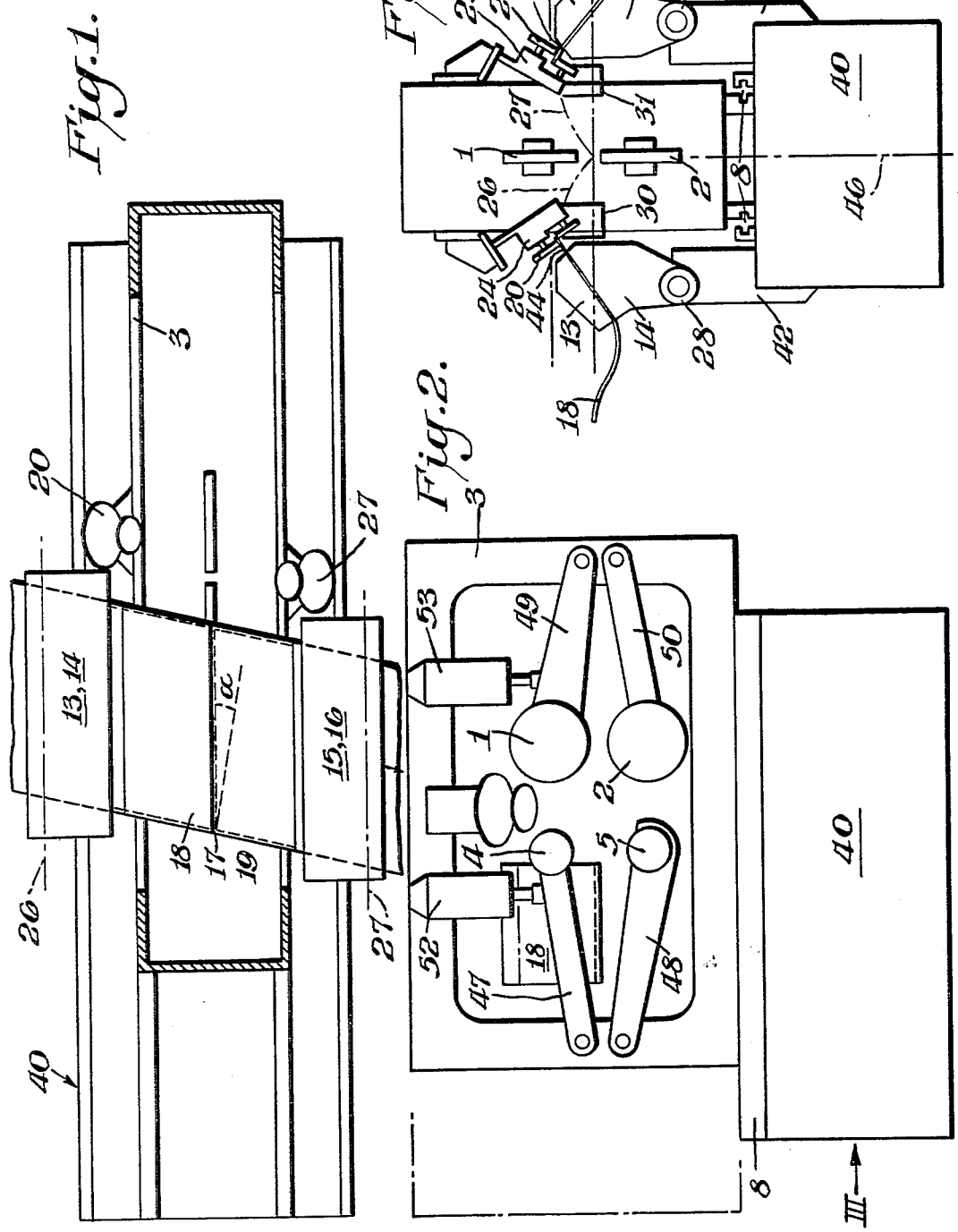

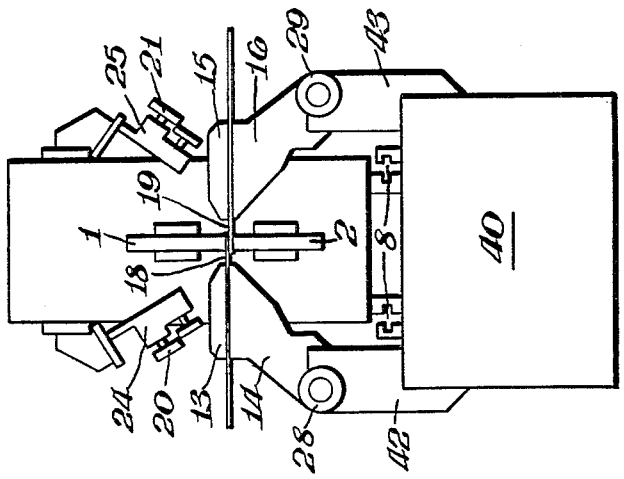
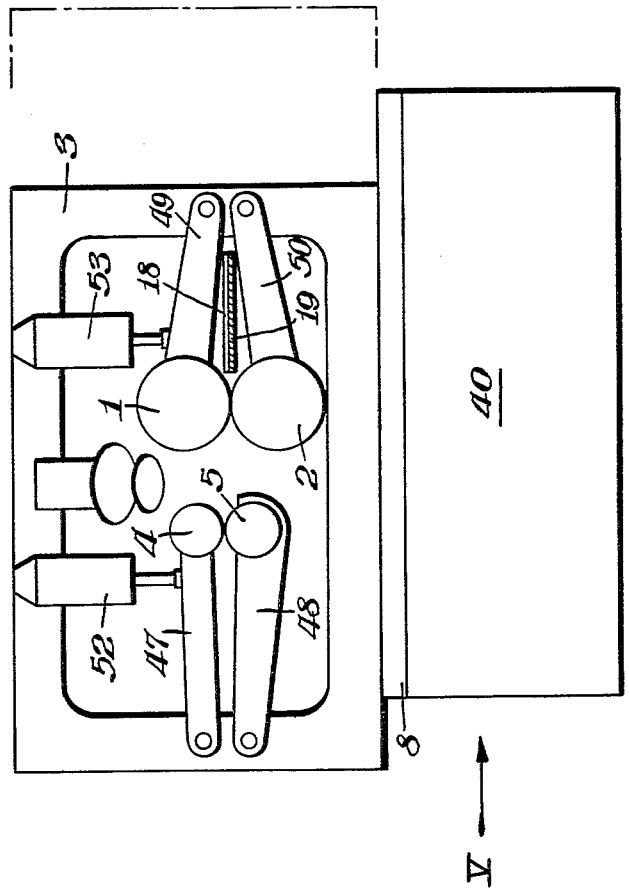

ABSTRACT OF THE DISCLOSURE

Opposite ends of a pair of coils are clamped and bent out of the welding plane where they are cut levelly along a parallel cutting line. The cut ends are then bent back to the welding plane one at a time to permit an overlap, and finally the overlapped ends are welded together to form a single band from the two original coils.

BACKGROUND OF THE INVENTION

Processes of this type are employed for example for welding together steel bands in cold milling trains. In this connection, after a coil is unrolled the band end of this coil is welded with the band beginning of a following coil to result in a continuous band.

In a known band welding machine the band ends in the welding or band plane are held in two clamping jaw pairs and are levelly cut. The ends are then seized by mashing rollers and pushed against each other until the levelly cut band ends overlap. Finally the ends are welded. In the entire process the band ends are located in the welding plane.

In order to bring about an overlapping of both band ends in this known device, the clamping jaws must be loosened and the mashing rollers are set up and put in operation.

BRIEF DESCRIPTION OF INVENTION

An object of this invention is to construct a simple process of the above named type. The invention is characterized in that the band ends are bent out from the welding plane, in contrast to conventional arrangements where the cutting takes place in the welding plane. According to the invention, the band ends, which are seized by the clamping jaws for cutting, can remain clamped in the clamping jaws until the welding is completed. It is sufficient for this purpose to construct the clamping jaws to be swingable.

With conventional arrangements the clamping jaws are situated closely together during the welding process to provide a secure holding. However this results in very little space remaining for the cutting process. In such a process the jaws must also be removed before the welding process can be carried out, since the welding process takes place essentially at the same spot. In the process according to this invention, the cutting process takes place in another plane, so that sufficient space is present for the cutting device, which also need not necessarily be removed in order to carry out the welding process since the welding takes place in another plane. Although one band end can be bent to one side of the welding plane and the other band end to the other side for cutting, it is more advantageous to bend both band ends toward the same side of the welding plane, because the cutting process then takes place only on one side of the welding plane which also requires only a single cutting means for both band ends. This cutting means can be, for example, constructed as double shears or the like.

The cutting lines—that is those lines along which the level cutting takes place—are arranged in the cutting plane with intervals between each other with respect to the longitudinal direction of the band. In the welding process the band ends should overlap.

This makes it necessary in the described known process after the cutting process, to push the band ends against and over each other. In this connection, the frontal edges must be staggered against each other with respect to their height level, so that they do not bump into each other. The rotation step provided according to this invention makes it possible to bring about a considerably simpler overlapping of the band ends. This can take place after the cutting while the band ends are bent back into the welding plane.

If both band ends are bent out toward the same side for the cutting and at the same time are bent back into the welding plane, then the frontal edges meet each other shortly before the welding plane. However, this can be easily avoided in that the bending back of one band end opposite that of the other takes place in a time sequential or staggered manner. This time staggered displacement need only be as large as is necessary for the levelly cut frontal edges of the band ends not to bump against each other while they are arranged over each other for the overlapping.

A band welding machine with a clamping jaw pair for each band end is characterized for the carrying out of the process according to the invention in that the clamping jaw pairs are rotatable about the axes of rotation parallel to the seam. Each jaw pair is displaceable to a welding position in which the band ends overlap each other from a cutting position in which it cooperates with arranged cutting means for the straight cutting of the arranged band end and in which the cutting lines are spaced in the longitudinal direction of the band.

A suitable further construction of this band welding machine is characterized in that the clamping jaw pairs are swingable into a welding position in which they are extended in the welding plane. The band ends can then be seized by the clamping jaws prior to the beginning of the cutting procedure and remain clamped without interruption until the welding process is completed.

The cutting means require conduits and mountings and the like which have sufficient room in the cutting place in the processes and devices according to the invention. In order to be able to observe the cutting process and because of being obstructed by the cutting means regardless of the height of the welding plane above the floor, it is recommended to arrange the cutting means for both band ends above the welding plane and to construct the clamping jaw pairs swingably in a cutting position above the welding plane.

In the known mentioned band welding machine, there is provided a double stroke shears as the cutting means. Such cutting means is extremely costly with respect to operation and also contains very bulky parts. A considerably more advantageous constructive form is achieved when according to a preferred further construction of the band welding machine of this invention, there are provided roller shears as the cutting means.

The rotating support for the clamping jaw pairs with their axis of rotation could be placed in the welding plane. However, this requires considerable effort because of the forces to be reversed in order that space remain for the band conduit. On this basis, the rotatable supports for the clamping jaw pairs are arranged with their axes of rotation suitably below or above the welding plane, and particularly according to a preferred embodiment of the invention on the side of the welding plane opposite that of the cutting means; i.e. below the welding plane where the cutting means lies above the welding plane.

A compression of the band ends in the bending back into the welding plane, can be easily avoided with respect to band welding machines according to the invention in that the rotating support for the clamping jaw pairs (referring to the longitudinal direction of the band) are spaced with mirror symmetric arrangement outside the cutting lines.

When the band ends, as already mentioned, remain clamped during the cutting and welding steps, then the overlapping can be determined by the arrangement of the cutting lines.

The invention further relates to a device for the joining of band ends along a seam running transversely to the longitudinal direction of the band with a clamping means for each band end and cutting means for the straight-cutting of the band ends along the seam and welding means; the clamping jaw pairs, the cutting means, and the welding means being arranged parallel to each other with reference to their contact.

Processes for seam welding of band ends serve for example in cold-rolling trains to attach the band beginning of a new coil to the band end of a terminating coil. This takes place by a welding transversely across the band. The welding is carried out if possible so that the connecting point can freely run through the subsequent devices of the cold-rolling train. In this connection, the subsequent devices generally seize on at the same height of the band. In order that the seam does not come in contact in its entirety at the same time, the seam is arranged transversely to the longitudinal direction of the band, usually tilted at a small acute angle value against the cross-direction of the band. In welding devices of the initially named type, the clamping means, the cutting means, and the welding means are arranged with reference to their effect parallel to each other, namely along the seam, so that the entire length of the seam results under the same limiting conditions. Accordingly, the band ends are therefore introduced transversely into such devices.

In a device of the initially named type clamping jaw pairs are arranged in the seam direction at the same height. The one band end then lies, as a result of the transverse position of the band, in the one jaw (shifted to one side) and the other band end in the other jaw (shifted to another side), and in each jaw there remains on the opposite side a piece of the effective width of the jaw unused. The effective width of the jaws must therefore be greater in this known device than the width of the widest band to be processed.

In the interests of a space and economy, it is a further object of the invention to construct a welding device of the initially named type in such a manner that the clamping means can be used in their complete effective width. The invention is thus characterized in that the clamping means are arranged displaced relative to each other in the direction of the seam in accordance with the sloping position of the seam.

According to the invention, the band ends introduced transversely and in elongation to each other into the clamping means, disregarding the required tolerance, can be as wide as the effective width of the clamping means.

An unused part of the clamping jaws—as in the known device—is therefore avoidable according to the invention At the same maximum band width of the band to be processed, clamping jaws suffice for the devices according to the invention with samller effective width than in the known device.

In devices of the initially named type, the cutting means serve to cut smoothly the band ends arranged against each other protruding from the clamping means. In the mentioned known device, the cutting means make a straight cut at each band end. These two cuts lie parallel to the seam direction and at a distance from each other. In the known device, impact shears with two cutting edges are provided as the cutting means. With regard to the effective width, the same hold true for the cutting edges as for the clamping jaws. Accordingly, because of the spacing of the two cutting edges and the sloping position of the band ends, there is always a partial piece of each cutting edge extending and unused. The object of a suitable further development of the invention, to which independent importance is due, in the interests of a space and cost saving construction, is to build a device of the initially named type in such a manner that the cutting means are usable in their full effective width. This further development of the invention is characterized in that for each band end there is provided a cutting means and that the cutting means are arranged displaced relative to each other transversely to the seam direction with spacing in between and in the seam direction in accordance of the sloping position of the seam. According to the invention the band ends introduced transversely and in elongation to each other into the clamping mean, disregarding the required tolerance, can be as wide as the effective width of the clamping means. For devices according to the invention at the same maximum band width of the band to be processed, cutting means with a smaller effective width than in the known device are sufficient.

In the range in which the impact shears become effective in the known device, the welding process also takes place. The impact shears must be removed for this purpose. With respect to impact shears, this requires bulky means which are very heavy and therefore need considerable bulky carrier means. A considerably simpler embodiment results when the cutting means are roller shears, which are arranged in the direction of the seam displaced in relation to each other on a common carriage movable longitudinally in the direction of the seam. The invention makes allowances in this connection that under certain circumstances even the roller shears must be removed for the welding process. This can take place in the seam direction. The movement required for this and the movement required for the shear cutting of the roller shears can be carried out according to this further development of the invention by a single carriage. A special carriage for the shear cut of the roller shears is therefore not required.

After the rollers are arranged in a displaced manner according to the invention, it is also unimportant for their effective width how wide they are separated. It is possible therefore to conduct them closely in front of the clamping jaw pairs for the shear process without disadvantages and to make full use in the shear process of the holding which is given by means of the clamping jaw pairs.

BRIEF DESCRIPTION OF DRAWINGS

FIG. 1 is a plan view of one embodiment of this invention in the starting position;

FIG. 2 is a side view of FIG. 1 with parts removed for the sake of clarity;

FIG. 3 is an end view according to arrow III of FIG. 2;

FIG. 4 is a view similar to FIG. 2 but in the other end position of the carriage after completion of the cutting process and prior to the welding process;

FIG. 5 is a view according to arrow V of FIG. 4;

FIG. 9 shows the clamping jaw pair of FIG. 6 in the welding position, but opened, so that the band ends welded together can be pulled through.

DETAILED DESCRIPTION

Figure 6:
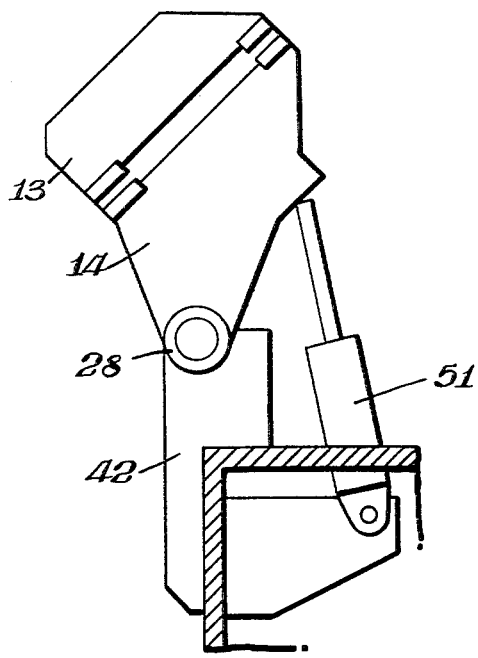
FIG. 6 is an elevational view of a clamping jaw pair of FIG. 3 in the cutting position and opened for the insertion of a band end.

In the drawing, a basic cradle is designated with 40 upon which a carriage 3 is movably supported in a carriage conduit 8. The carriage 3 (as seen in FIG. 2) has the form of a rectangular frame. The upper parts of the carriage 3 are shown cut off in FIG. 1 for the sake of clarity.

As particularly seen in FIG. 3, at each carrier 42, 43 on the base cradle, there are linked two clamping jaw pairs 13, 14 and 15, 16. The rotating support for the clamping jaw pairs 13, 14; 15, 16 are designated with 28 and 29. The axes of rotation 26, 27 (FIG. 1) of the rotating support 28, 29 extend in a horizontal direction parallel to each other and vertical to the drawing plane of FIG. 3. The clamping jaw pairs 13, 14 and 15, 16 serve for the receipt and for securing of both of the band ends 18, 19 to be welded together in an overlapped manner. These ends of bands 18, 19 are for example the ends of steel bands. The one band end 19 is the end of a terminating coil, while the other band end 18 is the beginning of a new coil. Both band ends are connected together during the course of a rolling train processing, so that both bands can be pulled continuously through the rolling train.

The band welding machine according to the invention as shown by FIG. 1 is at a small acute angle $a$ transversely against the passage direction of the steel band, since it is desirable that the welding seam does not extend at right angles to the longitudinal direction of the steel band but be disposed at a certain angle $a$ thereto so that the seam does not enter with its entire width simultaneously into the subsequent roller pairs and processing devices.

The effective width of the clamping jaw pairs 13, 14; 15, 16 is somewhat larger because of tolerance reasons than the distance between the two band edges resulting from this sloping position. According to the sloping conduction of band ends 18, 19 as seen in FIG. 1, the clamping jaw pairs 13, 14; 15, 16 are arranged displaced relative to each other, so that the band ends can essentially be clamped centrally in the clamping jaw pairs 13, 14; 15, 16.

The clamping jaw pairs 13, 14; 15, 16 are swingable from a welding position limited by stops, as shown in FIG. 5, to a cutting position also limited by stops as seen in FIG. 3.

In the welding position, the clamping planes of the clamping jaws extend in the welding plane 22, preferably of the band plane, that is the plane in which the steel band would normally be conducted and in which the welding takes place. In the cutting position, the clamping planes are at an angle opened downwards.

Clamping jaw pairs 13, 14; 15, 16 are shown in the cutting position in FIG. 1 as well as in FIG. 3. Band ends 18, 19 are shown clamped in FIG. 3 and as a result are bent upwards from the welding plane 22 in which they are normally clamped. They are clamped in the clamping jaw pairs in such a manner that they protrude with their free ends from the clamping jaw pairs on the inner side. On this processing strip occurs the procesing (i.e. the level cutting, the welding, and the plane rolling) of the seam. The processing strips 44, 45, extend in the cutting position of the clamping jaw pairs 13, 14; 15, 16 transversely upwards at the level of a cutting plane 23.

Two roller shear pairs are designated with 20, 21 each of which are supported on a supporting frame 24, 25. Each roller shear pair consists of two shear rollers, of which one acts as a knife and the other as a counterknife. The shear rollers are mounted turnably with a special drive for the shear rollers generally not being provided. The supporting frames 24, 25 are movable along the accompanying clamping jaw pair 13, 14; 15, 16, referring to the cutting position of this clamping jaw pair. The roller shears 20, 21 are so arranged and adjusted that by the movement of the roller shear carriage the processing strips are levelly cut with the obtainment of residual processing strip protruding from the clamping jaw pair. The size of this residual processing strip can be adjusted by corresponding adjustment of the supporting frames 24, 25 or roller shear pairs 20, 21.

Both roller shear pairs 20, 21 are, as seen in FIG. 1, arranged displaced to each other on the same basis as the clamping jaw pairs 13, 14; 15, 16 in order to be able to cut the band ends with the consideration of the inclined band passage. Below each roller shear pair 20, 21 there is provided at carriage 3 a receiver container 30, 31 for the trimmings.

Two welding rollers 1 and 2 and two mashing rollers 4 and 5 are turnably supported at carriage 3 at the free ends of swinging levers 47–50, and in such a manner that the median planes of these rollers 1, 2, 4, 5 are situated in the mirror symmetric plane 46. The axes of the welding rollers 1, 2 lie vertical over each other as do the mashing rollers 4 and 5.

The welding rollers 1, 2 and the mashing rollers 4, 5 can take a rest position in which they do not touch each other according to FIGS. 2 and 3 and from there are swung into an operating position in which they touch each other in the welding plane in accordance with FIGS. 4 and 5.

The welding rollers and mashing rollers together form the welding device. The welding rollers connect the overlapped band ends on an inductive passage, and the mashing rollers equalize the overlapping on the band thickness.

The distance between the welding rollers 1, 2 and the mashing rollers 4, 5 determines, together with the speed at which the carriage 3 is propelled during the welding process, the size of the time interval which passes between the welding process and the subsequent mashing process. This time span is chosen by coresopnding measurement of this distance between the welding rollers and the mashing rollers and the conveying speed of the carriage during the welding process, in such a manner that the mashing process takes place outside the blue brittleness range.

The carriage is pushed one time one way and another the other way on the carriage guide 8 during each welding process, and namely from the position according to FIG. 2 to the position according to FIG. 4 and back. A drive unit serves to drive the carriage which is accommodated in the basic cradle and is not shown for the sake of clarity.

For the activation of the clamping jaw pairs there are provided hydraulic drive means. The hydraulic drive means for closing and opening the clamping jaw pairs are also not shown for the sake of clarity. The hydraulic drive means for deviating of the clamping jaw pairs illustrated in FIGS. 6–9 are shown in these figures and are designated by 51. They are, however, not shown in FIGS. 1–5.

The welding rollers 1, 2 and the mashing rollers 4, 5 normally are located in the rest position seen in FIG. 2 and only with the carrying out of the welding are they located in the operating position illustrated in FIG. 4. They are moved from one position to the other by hydraulic drive means. These hydraulic drive means are shown in FIGS. 2 and 4 for the upper rollers and designated by 52, 53. Those for the lower rollers are constructed exactly the same, but are not shown for the sake of clarity.

For controlling the diverse drive means there is provided a central controlling mechanism which is manually activated for a complete welding cycle and has limit switches for the end positions of the diverse parts to be moved, particularly carriage 3. This controlling mechanism and the limit switches as well as the accompanying driving powers are now shown also for the sake of clarity.

Figure 7:
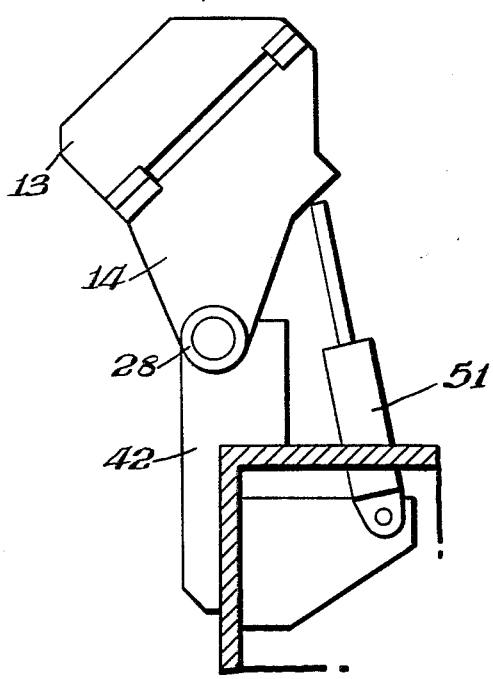
FIG. 7 shows the clamping jaw pair of FIG. 6 in the cutting position and closed.

The mode of operation is as follows: With the operation of the rolling train, in which is located the band welding apparatus illustrated, a steel band, in the sloping position in which the band ends 18, 19 are illustrated in FIG. 1, runs through between the clamping jaws of the opened clamping jaw pairs located in the welding position. This steel band runs along the welding plane 22, shown by dotted lines in FIG. 3. The welding rollers 1, 2 and the mashing rollers 4, 5 are located here in their rest position illustrated in FIG. 2, and the carriage 3, as illustrated in FIG. 2, is moved to the side of the welding rollers in its end position. The band welding apparatus remains inactive in this position until the uncoiling band comes to the end. If band end 19 of the unrolling coil is located in the range of the inventive machine, then the band end is held secure by clamping jaws 15, 16. The processing of the band in the milling train is not interrupted, since the terminating band behind the welding apparatus has an inoperative adjusting length. Then a band end 18—or more correctly a band beginning—of a new coil is pulled up to the band welding machine, so that this band end extends in the inclined position in the elongation of the terminated band end 19, illustrated in FIG. 1. Both opened clamping jaw pairs are moved into their cutting position, according to FIG. 6. Then both band ends 18, 19 are manually inserted into the clamping jaw pairs 13, 14; 15, 16, and the clamping jaw pairs are closed (FIG. 7). The band ends are now located in the position shown in full in FIG. 1 and illustrated in FIG. 3. In FIG. 2 the clamping jaw pairs are not shown, but the band end 18 turned away from the viewer is shown in this position. In this position the processing strips 44, 45 protrude in the front from the clamping jaws into the operating range of the roller shears 21 or into the cutting plane 23. After the clamping jaws have clamped the band ends in the cutting position, carriage 3 is set in motion and is conducted from its end position, according to FIG. 2, into its end position, according to FIG. 4, the welding rollers 1, 2 and the mashing rollers 4, 5 remaining inactive and the cutting rollers 20, 21 cutting levelly both of the processing strips along the clamping jaw pairs, so that there still only protrude relatively short processing strips from the clamping jaws. As a result of the displaced arrangement of the roller shears 20, 21 corresponding to the inclined position of both band ends, according to angle a of FIG. 1, both roller shears 20, 21 are simultaneously started with the cutting and also complete the cutting simultaneously. The strips cut off here fall into the receiving container 30, 31. At the end of this carriage run the band ends are levelly cut and the welding rollers 1, 2 are located on the other side of the edge of the band ends and still in the rest position illustrated in FIG. 2.

Figure 8:
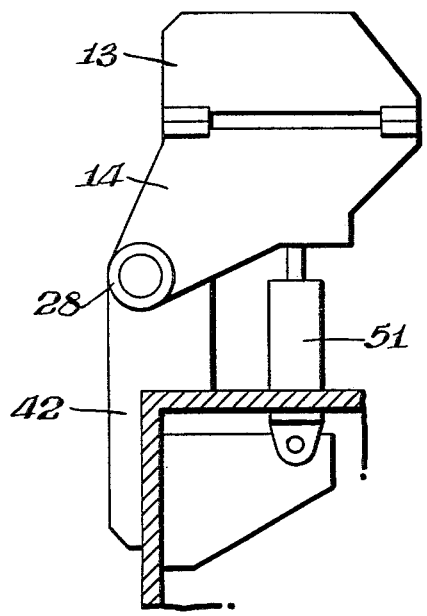
FIG. 8 shows the clamping jaw pair of FIG. 6 in the welding position and closed for the carrying out of the welding process.
Figure 9:
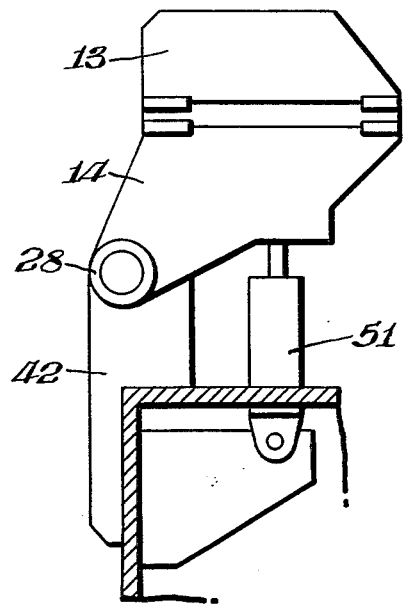

After the cutting process the clamping jaw pairs are moved from their cutting position, shown in FIG. 3, into the welding position shown in FIGS. 5 and 8. The clamping jaw pairs 13, 14; 15, 16 and their rotating supports 28, 29 are so measured and arranged that the levelly cut edges make arcs as shown in FIG. 3, which cross somewhat above the welding plane. The welding rollers 1, 2 extend so far over the band range that the levelly cut edges of the band ends in this swinging process cannot touch the welding rollers. The rotating movement of the clamping jaw pairs 13, 14 to the welding position takes place somewhat later than that of the clamping jaw pairs 15, 16, so that both cut edges of the band ends cannot bump against each other but instead come to overlap in the cutting plane 22 as seen from FIG. 5.

The clamping jaw pairs 13, 14; 15, 16 are so constructed and supported that in the rotating movement from the cutting position to the welding position exerts a pull on the band ends 18, 19. Hence both band ends are here slightly tightened up. The clamping jaw pairs can also be so constructed and supported that no tightening up results. Although not recommended, one could also support them in such a manner that the band ends are pushed back in this swinging process.

The size of the overlapping, aside from the constructive formation of the clamping jaw pairs 13, 14; 15, 16—as already mentioned above—can also be determined by the position of the roller shears 20, 21. It can be set to a certain value in that the supporting frames 24, 25 of the roller shears are accordingly adjusted against the respective band ends, i.e. in the drawing plane of FIG. 3. Supporting frames 24, 25 are preferably so adjusted that there results an overlapping of one to one-and-a-half fold band strength.

The overlapping band ends extend in the welding plane 22 in the welding position, and the welding rollers 1, 2 are located, as seen from FIG. 4, close to these band ends, but not yet in contact with them. The welding rollers 1, 2 are now brought into their operating position according to FIG. 4, just as the mashing rollers, 4, 5, which are pressed against each other by suitable pressure. The named rollers contact each other in the welding plane. In this position of the rollers carriage 3 is moved from the position, according to FIG. 4, back to its starting position, according to FIG. 2, and completes the so-called carriage return run. In this connection, the welding rollers 1, 2, which are acted upon with voltage, roll over the band ends which overlap each other, so that there forms a welding seam 17 according to FIG. 1. Subsequently, the mashing rollers 4, 5 roll over the still warm welding seam and mash this together to about a single steel plate strength. The carriage runs in both directions with constant speed. The carriage forward move follows because of time reasons at a higher speed, for example about 6 meters per minute—than the carriage return move. At a carriage return move speed of about 2 meters per minute the welded places can cool off only to a temperature above the blue brittleness range as a result of the small distance between the welding rollers and the mashing rollers, so that the mashing rollers are activated in a temperature range above the blue brittleness range without requiring for this a special heat supply outside the welding place.

At the end of the carriage return move, the welding rollers 1, 2 are brought in its rest position together with mashing rollers, 4, 5, as seen in FIG. 2. The carriage return move is so measured that the welding rollers and the mashing rollers in their operating position run along the entire seam 17.

The seam welding is now completed. The clamping jaw pairs 13, 14; 15, 16 are now opened keeping their welding position (FIGURE 9), and the welding location can be further conveyed by the rolling train. In this connection the band end 19 pulls over the band end 18 (the band of the next coil) through the rolling train, and the band welding machine is located in its starting position.

It is pointed out that carriage 3 completed in each welding process a forward and return move. During the carriage forward move only the roller shears 20, 21 are in operation, and during the carriage return move, welding rollers 1, 2 and mashing rollers 4, 5 are in operation. The carriage stroke is so measured that in both end positions the mashing rollers 4, 5 and the welding rollers 1, 2 are next to the band ends. The roller shears 20, 21 then, because of their arrangement in the middle of the common effective width of the mashing rollers and the welding rollers, also stand next to the band ends. The carriage stroke is, in the interests of a narrow construction and a small lateral space requirement of the band welding machine, so measured that these requirements are fulfilled exactly with the necessary tolerances.

What is claimed is:

1. A band welding machine for welding together the ends of separate bands to form a single continuous band comprising a pair of clamping jaws for each band end, cutting means for cutting the band ends along a line spaced from the plane of band travel and the plane wherein the band ends overlap, said clamping jaws being connected for moving the band ends from the cutting position to the overlapping position, and said clamping jaws being rotatable about axes of rotation parallel to the seam formed by the lapped ends.

2. A band welding machine as set forth in claim 1 wherein said clamping jaws are connected for swinging into a welding position in which they are extended in the welding plane.

3. A band welding machine as set forth in claim 2 wherein said cutting means are disposed above the welding plane, and said clamping jaws are swingable into a cutting position above the welding plane.

4. A band welding machine as set forth in claim 3 wherein said cutting means are roller shears.

5. A band welding machine as set forth in claim 3 wherein the axes of rotation of said clamping jaws is on the side of the welding plane opposite said cutting means.

6. A band welding machine as set forth in claim 1 wherein said clamping jaws are mounted on rotatable supports, said supports being on opposite sides of the longitudinal axis of the bands, said supports being disposed outside the cutting lines at intervals and being constructed as mirror images of each other.

7. A device for connecting band ends along a seam disposed across the longitudinal direction of the bands comprising clamping means for each band end, cutting means for the straight cutting of the band ends along the seam, welding means for welding the cut band ends together along the seam, said clamping means and said cutting means and said welding means having their connections parallel to each other, and said clamping means are displaced relative to each other in the direction of the seam in accordance with the inclination of the seam.

8. A device as set forth in claim 7 wherein said cutting means are displaced relative to each other transversely to the seam direction and spaced from each other with respect to the seam direction a distance in accordance with the inclination of the seam.

9. A device as set forth in claim 7 wherein said cutting means includes roller shears mounted upon a common carriage which is movable longitudinally in the direction of the seam.

References Cited

UNITED STATES PATENTS

| 2,181,502 | 11/1939 | Biggert | 29—33 |
| 3,235,703 | 2/1966 | Seeloff | 219—82 |

FOREIGN PATENTS 1,129,638   5/1962   Germany.

RICHARD H. EANES, Jr., Primary Examiner

U.S. Cl. X.R.

29—33